(12) United States Patent
Rosskamm et al.

(10) Patent No.: US 8,478,696 B2
(45) Date of Patent: *Jul. 2, 2013

(54) SERVICE PLAN PRODUCT AND ASSOCIATED SYSTEM AND METHOD

(75) Inventors: Daniel Rosskamm, Minneapolis, MN (US); Joseph Brenny, Minneapolis, MN (US); Steven Orzel, Minneapolis, MN (US); Stephen L. Eastman, Plymouth, MN (US)

(73) Assignee: Target Brands, Inc., Minneapolis, MN (US)

( * ) Notice: Subject to any disclaimer, the term of this patent is extended or adjusted under 35 U.S.C. 154(b) by 259 days.

This patent is subject to a terminal disclaimer.

(21) Appl. No.: 12/842,436

(22) Filed: Jul. 23, 2010

(65) Prior Publication Data
US 2010/0287058 A1 Nov. 11, 2010

Related U.S. Application Data

(63) Continuation of application No. 11/678,366, filed on Feb. 23, 2007, now Pat. No. 7,797,252.

(60) Provisional application No. 60/862,421, filed on Oct. 20, 2006.

(51) Int. Cl.
*G06Q 10/00* (2012.01)
*G06Q 30/00* (2012.01)

(52) U.S. Cl.
CPC .............. *G06Q 30/01* (2013.01); *G06Q 30/012* (2013.01)
USPC ........................................ 705/302; 705/305

(58) Field of Classification Search
None
See application file for complete search history.

(56) References Cited

U.S. PATENT DOCUMENTS

| 4,583,308 | A | 4/1986 | Taub |
| 6,082,773 | A | 7/2000 | Janesky |
| 6,625,581 | B1 | 9/2003 | Perkowski |

(Continued)

FOREIGN PATENT DOCUMENTS

| JP | 07-199817 | 8/1995 |
| JP | 08-282161 | 10/1996 |
| JP | 2004-355267 | 12/2004 |
| JP | 2005-165721 | 6/2005 |

OTHER PUBLICATIONS

"Warranty Corporation of America Offers Customers a Smart Digital Lifeline," http://www.waca.com/pdf/WaCA_ForbesFeature.pdf, © 2002 Motive Communications, Inc.

(Continued)

*Primary Examiner* — Ryan Zeender
*Assistant Examiner* — H Rojas
(74) *Attorney, Agent, or Firm* — Nixon & Vanderhye P.C.

(57) ABSTRACT

A service plan product providing a tangible representation of a service plan includes a support backer and a tag removably coupled with the backer. The tag includes service plan account identification means corresponding to a service plan account stored in a database and plan administrator contact indicia. The tag is configured to be removed from the backer and applied to a primary product for which the service plan is provided, and wherein only the service plan account identification means is required for the service plan administrator to access the database to identify details regarding the service plan account. Related systems and methods are also disclosed and provide additional advantages.

6 Claims, 8 Drawing Sheets

U.S. PATENT DOCUMENTS

| | | | |
|---|---|---|---|
| 6,965,866 | B2 | 11/2005 | Klein |
| 7,183,924 | B1 | 2/2007 | Ku |
| 7,194,429 | B2 | 3/2007 | Takae et al. |
| 7,350,708 | B2 | 4/2008 | Melick et al. |
| 7,376,572 | B2 | 5/2008 | Siegel |
| 7,445,147 | B2 | 11/2008 | Hein |
| 2001/0042009 | A1 | 11/2001 | Montague |
| 2002/0091573 | A1* | 7/2002 | Hodes .................. 705/17 |
| 2003/0061104 | A1 | 3/2003 | Thomson et al. |
| 2003/0149573 | A1 | 8/2003 | Lynton |
| 2003/0212598 | A1 | 11/2003 | Raman et al. |
| 2004/0046033 | A1 | 3/2004 | Kolodziej et al. |
| 2005/0055272 | A1 | 3/2005 | Ryan et al. |
| 2005/0168339 | A1 | 8/2005 | Arai et al. |
| 2005/0182651 | A1 | 8/2005 | McIntyre et al. |
| 2005/0228724 | A1 | 10/2005 | Frangiosa |
| 2005/0278216 | A1 | 12/2005 | Graves |
| 2006/0106719 | A1 | 5/2006 | McDonnell et al. |
| 2006/0155565 | A1 | 7/2006 | Polevoy et al. |

OTHER PUBLICATIONS

"Sharp Systems of America," available at http://aqinfo.tmi-us.com/sharp/pdfs/ExtendedWarrantyWA3500.pdf at least as early as Feb. 2, 2004 (per http://www.archive.org).

"Zoeller Pump Co. Extended Warranty Details," available at http://www.zoeller.com/zcopump/zcopdfdocs/FM2148.pdf#search=%22zoeller%20warranty%22 at least as early as May 30, 2004 (per http://www.archive.org).

"Circuit City Advantage Protection Plan," http://www.circuitcity.com/ccd/lookLearn.do?cat=-11068%c=1, printed on Oct. 3, 2006.

"Find your Service Tag," http://support.dell.com/support/topics/global.aspx/supp...en/identifyyoursystem?c=us%cs=19&1=en&s=dhs&~modp=popup, printed on Oct. 3, 2006.

"Replacement & Service Plans," http://www.walmart.com/catalog/catalog.gsp?cat=130962, printed on Oct. 3, 2006.

"Birchwood Automotive Group—Saturn Saab of Pointe West—Extended Warranty," http://www.birchwood.mb.ca/service_warranty.php?dealerid=10007, printed on Oct. 18, 2006.

"ebay—Buyer Warranty Services," http://pages.ebay.com/help/warranty/buyer_overview.html, printed on Oct. 18, 2006.

"HP CarePack 1 Year Accidental Damage Protection W/ Express Repair extended Service Plan for Pavilion or Select Presario Notebooks (U4822A)," http://www.techexcess.net/hp-carepack-1-year-accidental-damage-protection-w-express-r . . . , printed on Oct. 18, 2006.

"Toshiba Extended Protection Plan," http://www.storm.ca/~prosys/toshibaWarranty.htm, printed on Oct. 18, 2006.

"5-Star Service for Consumer Power & Scooters," http://www.invacare.com/images/5starserviceplan/5_StarBrochure_R14.pdf#search=%22extended%20service%20plan%20s, © 2006 Invacare Corporation.

BestBuy Performance Service Plan, Mar. 9, 2005, pp. 1-2.

* cited by examiner

SERVICE PLAN PRODUCT AND ASSOCIATED SYSTEM AND METHOD

CROSS-REFERENCES TO RELATED APPLICATIONS

This application is a continuation of U.S. patent application Ser. No. 11/678,366, filed Feb. 23, 2007 now U.S. Pat. No. 7,797,252, which claims the benefit of U.S. Provisional Patent Application Ser. No. 60/862,421, filed Oct. 20, 2006, the entire contents of each of which are hereby incorporated by reference in this application.

STATEMENT REGARDING FEDERALLY SPONSORED RESEARCH OR DEVELOPMENT (Not Applicable)

BACKGROUND OF THE INVENTION

When purchasing electronic or other similar products, consumers are commonly solicited by the merchant or retailer selling the product with regard to purchasing an extended warranty or other service plan. In many instances, consumers are subjected to high pressure sales of such plans and are often confused as to the terms and/or hidden fees of such plans. As such, instead of evaluating the benefits offered by service plans, many consumers categorically refuse such service plans to avoid the associated record-keeping burden, possible hidden fees, and/or possible hidden service plan terms. Alternatively, many consumers purchase such plans without understanding the plan details and requirements. In addition, typical service plans require the consumer to provide personal profile information, model number, serial number, purchase date, store information, receipt information, etc. often times at the point of sale, which can be time consuming and contributes to consumer frustration with a retailer.

In some instances, to decrease the time spent at the point of sale during purchase of service plans, many plans allow the required information to be provided via a website following the sale. The service plan information is subsequently provided to the consumer in the form of separate service plan papers, receipt message(s), etc. However, consumers often forget to complete and return the necessary documents to the service plan provider. Failure to complete and return such documents may lead to invalidation of the plan or otherwise cause delays in provider response to claims made to the service plan for repair or replacement of the covered device. In particular, to utilize a service plan, the consumer is often required to present the service plan papers, the covered device, and often times even the original package for the device.

With the requirements for utilization of the service plan in mind, the consumer is not only charged with the duty of keeping papers and/or packaging, but also must remember which papers and/or packaging correspond to which devices. Such record keeping and storage requirements are a burden on the consumer. Furthermore, in many circumstances, these requirements are a burden that the consumer does not properly bear such that a claim cannot properly be made to the service plan due to misplaced papers, etc.

BRIEF SUMMARY OF THE INVENTION

One aspect of the present invention relates to a service plan product providing a tangible representation of a service plan. The service plan product includes a support backer and a tag removably coupled with the backer. The tag includes service plan account identification means corresponding to a service plan account stored in a database and plan administrator contact indicia. The tag is configured to be removed from the backer and applied to a primary product for which the service plan is provided, and wherein only the service plan account identification means is required for the service plan administrator to access the database to identify details regarding the service plan account. Related products, systems, components, and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION OF THE INVENTION

A service plan and associated product, system, and methods according to the embodiments described herein are configured to provide user protection and assistance in the event that an eligible primary, purchased product such as an electronic device, etc. is broken, defective, or otherwise has an issue requiring service, repair, or replacement. More particularly, the service plan is provided by a plan administrator configured to provide for or facilitate repair, replacement, or other servicing of the primary product as needed during a predefined term of the service plan. According to embodiments described herein, a service plan product is offered as a tangible representation of the service plan. The service plan product is purchased separate from the primary product either on the same or a later date of purchase as the primary product. The flexibility regarding when the service plan product is purchased decreases pressure on the consumer to make a decision regarding the service plan product purchase at the same time as the purchase of the primary product, thereby, providing a more comfortable, frustration-free shopping experience.

In one embodiment, a point-of-sale (POS) terminal or register processing the purchase of the service plan product is configured to initialize a service plan, more particularly, a service plan account, associated with the service plan product and to automatically associate the service plan account with the corresponding eligible, primary product (i.e. a product to which the service plan can be applied) being purchased in the same mercantile or sales transaction or otherwise identified from a prior consumer mercantile or sales transaction. The automatic association is saved to a database, such that the service plan account can be subsequently utilized, if necessary, without requiring additional registration information such as name, mail address, email address, phone number, etc. that identifies the consumer or other information that further identifies the primary product, etc. In this manner, registration with the service plan is quick and easy, which further contributes to an enjoyable shopping experience for the consumer.

In one embodiment, the service plan product purchased includes a removable tag such as a label or stickers, including a service plan account identifier and redemption indicia. Following purchase, the tag is removed from the remainder of the service plan product and applied to the eligible primary product. In one example, the tag contains all information required to make a claim to the service plan account such that the remainder of the service plan product, the purchase receipt(s) for the service plan product, the device packaging, etc. can all be discarded. As such, the consumer is free of any obligation (other than maintaining the tag coupled to the primary product) to maintain product or device materials for future reference. Therefore, the service plan is less burdensome on the consumer than typical service contracts.

Figure 1:
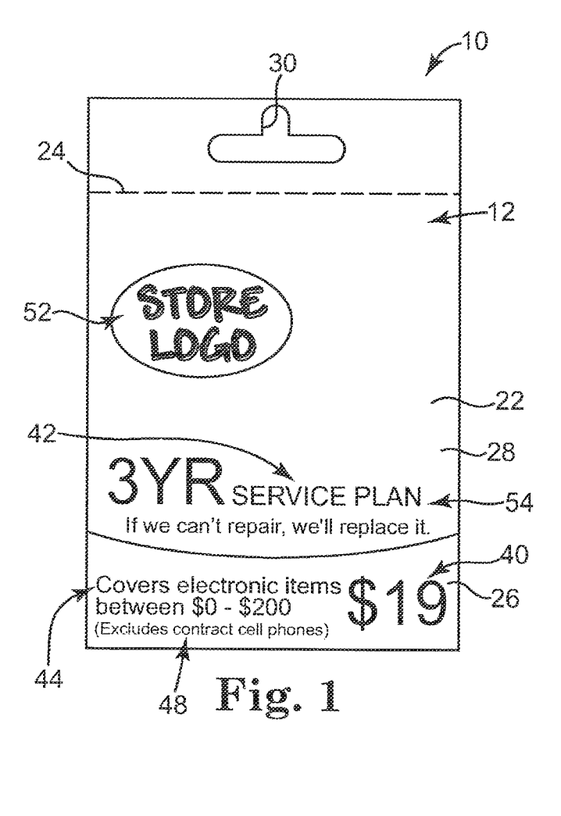
FIG. 1 is a front view illustration of a service plan product in a closed configuration, according to one embodiment of the present invention.
Figure 2:
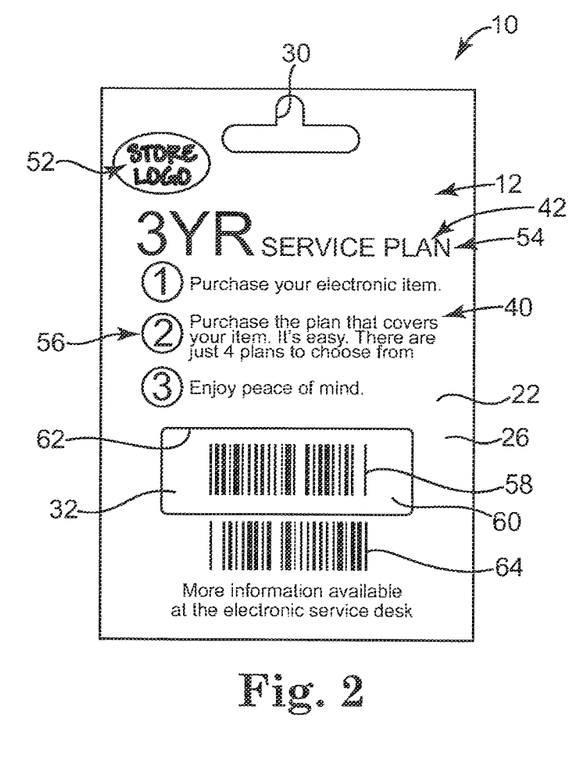
FIG. 2 is a rear view illustration of the service plan product of FIG. 1 in a closed configuration, according to one embodiment of the present invention.
Figure 3:
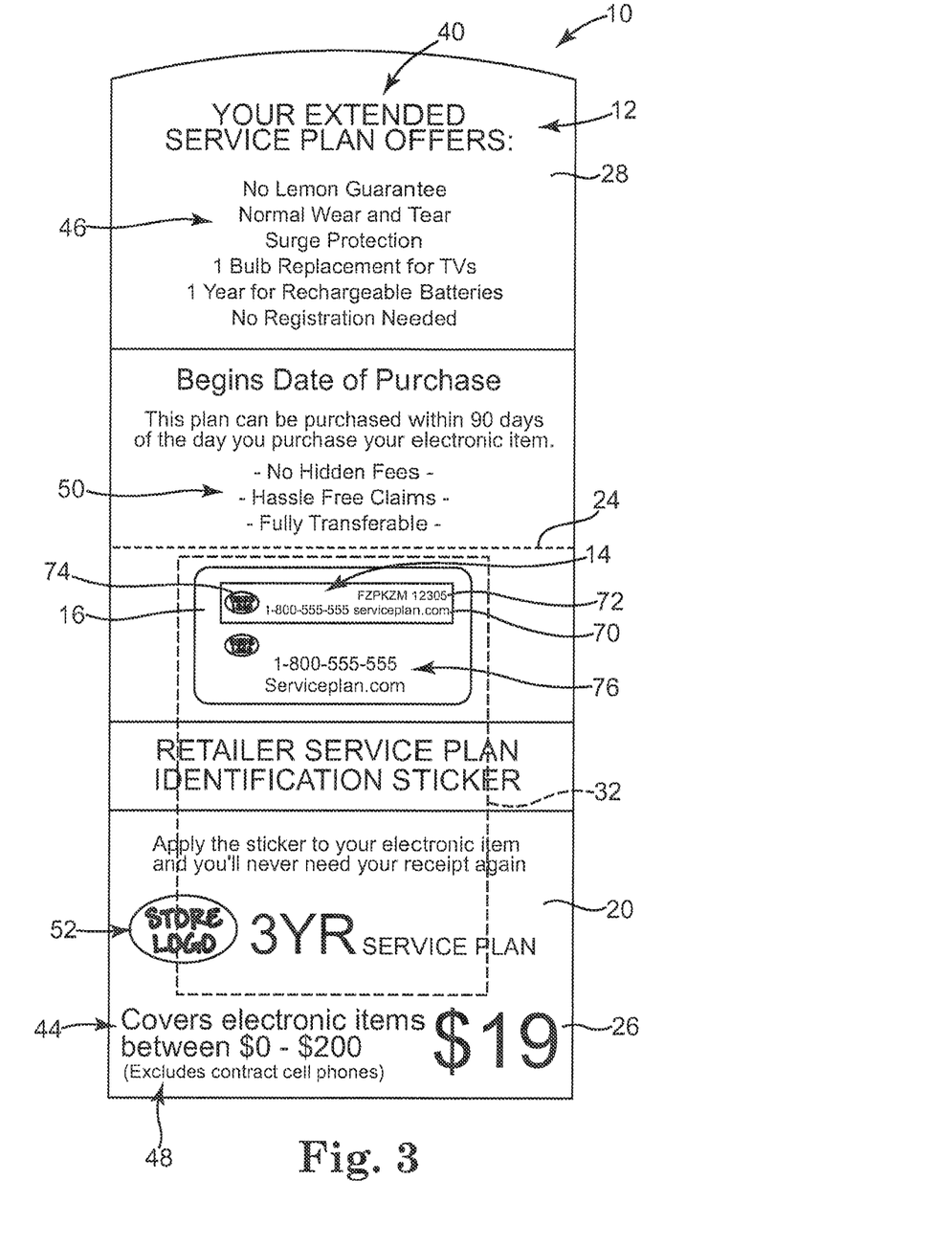
FIG. 3 is front view illustration of the service plan product of FIG. 1 in an open configuration, according to one embodiment of the present invention.

Turning to the figures, FIGS. 1-3 illustrate a service plan product 10 according to one embodiment of the present invention. Service plan product 10 includes a backer 12 and a tag 14 (FIG. 3) such as a sticker, label, or other suitable item. Backer 12 is configured to support, and in one embodiment, enclose, tag 14 during display. In one example, backer 12 comprises a single layer or multiple layers of paper or plastic material, for example, generally in the form of a relatively stiff but bendable/flexible card. Use of backer 12 formed from other materials is also contemplated. In one embodiment, at least a portion 16 of backer 12 is formed of or is coated with a material configured to releasably maintain tag 14 thereon. Accordingly, in one embodiment, tag 14, which includes all of the information necessary to assert a claim to the service plan, is selectively adhered to portion 16.

Although backers 12 may have any one of a variety of suitable configurations, in one embodiment, backer 12 is formed from a substantially planar material and has a substantially elongated and generally rectangular shape. In general, backer 12 defines an inside surface 20 (FIG. 3) and an outside surface 22 (FIGS. 1 and 2) opposite inside surface 20. In one example, backer 12 further defines a fold line 24 extending laterally across backer 12 such that backer 12 is divided into a main panel 26 and a second panel or flap 28.

Flap 28 is configured to rotate about fold line 24 such that first surface 20 of flap 28 is folded toward first surface 20 of main panel 26 to transition backer 12 into a closed position as illustrated in FIGS. 1 and 2. In one embodiment, when backer 12 is closed, tag 14 is interposed between main panel 26 and flap 28 such that tag 14 is substantially wrapped (i.e., hidden from view). In one embodiment, at least main panel 26 includes a support arm aperture 30 configured to receive a support arm or hook (not shown) when placed on display in a retail or other suitable setting. In one embodiment, backer 12 is configured to additionally support, and or enclose a contract sheet(s) 32 (generally indicated in broken lines in FIG. 3), which specifically states the terms of the service plan and associated contract that the consumer is entering into with the retailer or other plan administrator. Contract sheet 32 may be removably adhered to backer 12 and/or backer 12 may define a pocket or other chamber for maintaining contract sheet 32. In one embodiment, main panel 26 defines a chamber for selectively maintaining contract sheet 32 between two layers collectively defining at least a portion of main panel 26.

Backer 12 includes indicia 40 configured to readily provide general information to consumers regarding at least one of the scope, the cost, the terms, the features, etc. of the service plan associated therewith. Indicia 40 included on backer 12 are configured to convey to potential consumers what the service plan product 10 and associated service plan are, how the service plan generally works, what types of devices the service plan can be associated with, etc. In one embodiment, indicia 40 include information generally indicated at 42 identifying the product as being related to a service plan and/or information generally indicated at 44 regarding what product types the service plan applies to (for example, electronic items with a purchase price between $0 and $200) and listing a price for entering into the associated service plan contract (for example, $19). In one example, indicia 40 additionally or alternatively include details 46 regarding what benefits and services the associated service plan offers such as a "no lemon" guarantee, normal wear and tear coverage, surge protection, bulb replacement, battery replacement and or details 48 regarding exemptions, exceptions, and/or limitations of the service plan associated with service plan product 10.

Advantages of the service plan may also be touted by indicia 40, more specifically, as generally indicated as advantage markings 50, for example, by indicating when the service plan begins, details regarding how to purchase the service plan, and advantages otherwise promoting the service plan, such as "No Hidden Fees," "Hassle Free claims," "Fully Transferable," etc. Other indicia 40 such as branding demarcations 52 include any one or more of a store logo(s), store name(s), and slogans, and other demarcations 54 including advertising, instructions, directions, service plan description or features, seasonal markings, etc.

In one embodiment, backer 12 includes instructions as generally indicated at 56 describing how to initialize the service plan associated with product 10. Any other configuration of colors, markings, designs, text, etc. is also contemplated to promote the purchase of service plan product 10 and initialization of the associated service plan as will be described in further detail below. To facilitate initialization of a service plan, in one embodiment, backer 12 includes an account identifier 58 that is readily readable by a point-of-sale terminal, such as a kiosk, cash register, personal computer, etc. In one embodiment, account identifier 58 is in the form of a bar code, magnetic strip, smart chip, radio frequency identification (RFID) device, etc.

In one example, account identifier 58 is substantially unique such that it not only identifies the type of service plan but actually identifies the individual service plan assigned to the particular service plan product 10. In one embodiment, where account identifier 58 is visible, such as a bar code, magnetic strip, etc. rather than being included on backer 12, account identifier 58 is included on a separate insert 60 maintained by backer 12, for example, within the backer chamber, and positioned to be viewable or otherwise accessible, such as through a window 62 defined by main panel 26 of backer 12. In one embodiment, insert 60 is coupled to or otherwise is a part of contract sheet 32 (generally indicated in FIG. 3). Other embodiments, such as where account identifier 58 is an RFID device, account identifier 58 may not be visible from inside surface 20 or outside surface 22 of backer 12.

In one embodiment, account identifier 58 is a first account identifier, and service plan product 10, in particular, backer 12, includes a secondary identifier 64 such as a stock keeping unit (SKU) that identifies the product 10 as relating to a service plan and/or the type of service plan (for example, a service plan for electronic items between $0 and $200), but generally does not identify the individual service plan account. In such an embodiment, account identifier 58 and secondary identifier 64 collectively provide information regarding the type of service plan and the unique account associated with service plan product 10. Any other useful indicia, etc. may also be included on backer 12.

As described above, tag 14 is readily releasably attached (i.e. selectively attached) to backer 12, more specifically, to portion 16 of backer 12. In one embodiment, tag 14 is configured to serve as the sole consumer record of an initialized (i.e. active) service plan as will be further described below. As such, in one embodiment, tag 14 generally includes plan administrator contact information 70 and service plan account identification 72. Plan administrator contact information 70 may be a website, telephone number, mailing address, and/or any other suitable contact information suitable to facilitate a consumer (whether the original purchaser or a secondary consumer) to contact the service plan administrator to make a claim for repair, replacement, service, etc. of primary product 80 (FIG. 4) to the service plan.

Service plan account identification 72 is substantially different on each service plan product provided such that service plan account identification 72 is substantially unique to the service plan account it corresponds with. More specifically, service plan account identification 72 is configured to identify the specific service plan account associated with service plan product 10. In this manner, service plan account identification 72 is sufficient to identify the particular account to the service plan administrator when claims are made to the service plan. Tag 14 may additionally include other indicia, such as retailer or brand identification 74, as will be apparent to those of skill in the art.

Figure 4:
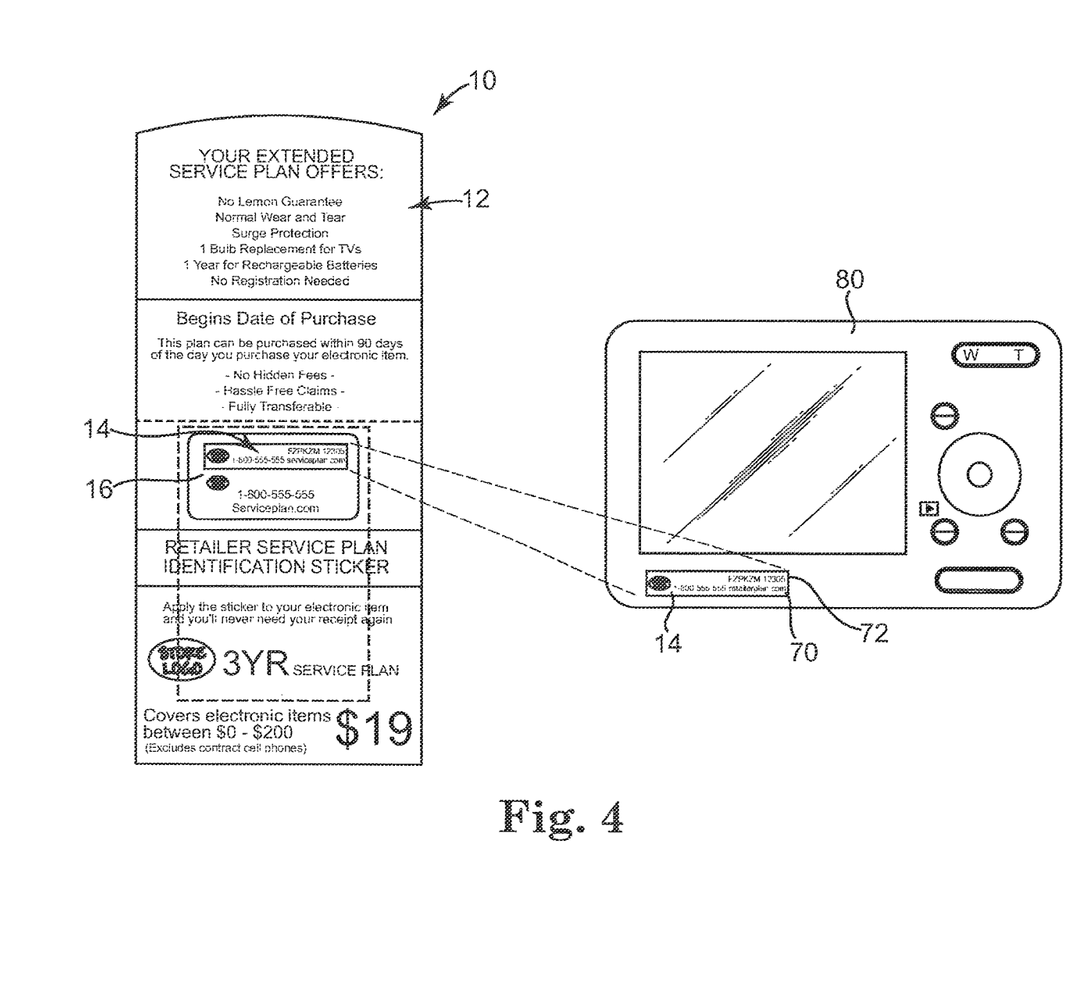
FIG. 4 is a front view illustration of the service plan product of FIG. 1 and an associated primary product, according to one embodiment of the present invention.

In one example, tag 14 includes an adhesive (not shown) such as a pressure sensitive or other suitable adhesive on a back surface thereof. Referring to FIG. 4, in one embodiment, the adhesive of tag 14 is configured such that tag 14 is readily removable from backer 12, in particular, from portion 16 of backer 12, while being configured to securely adhere tag 14 to primary product 80 (FIG. 4). In this manner, once tag 14 is applied to a primary product 80, tag 14 is not readily removable therefrom. In one embodiment, substantially unique account identifier 58 of service plan product 10 corresponds with an equally unique service plan account identification 72 such that when service plan account 10 is processed and account identifier 58 is read (e.g., optically read) by the POS terminal, the service plan account associated with tag 14 and service plan identification 72 is initialized.

Figure 5:
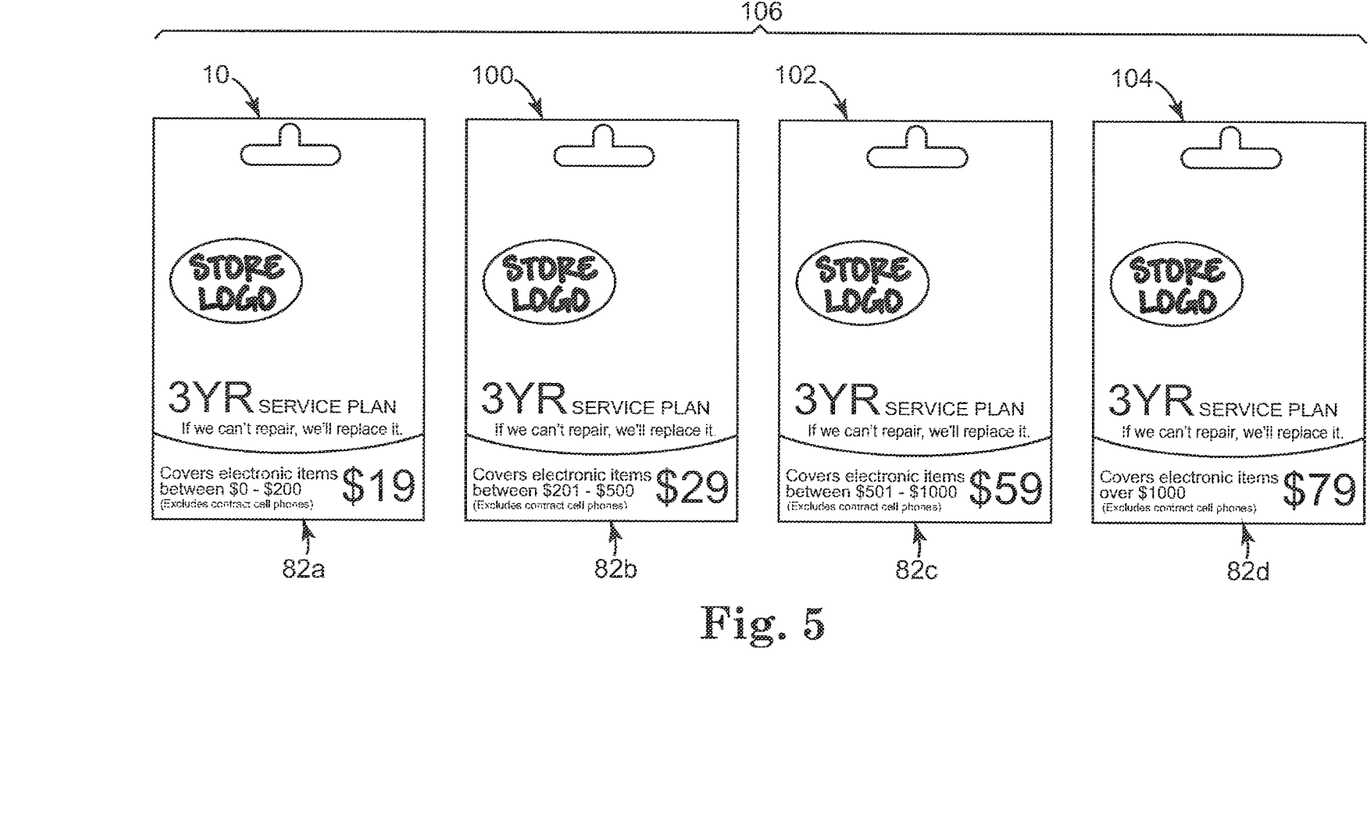
FIG. 5 is front view illustration of an assortment of service plan products offered to consumers, according to one embodiment of the present invention.
Figure 7:
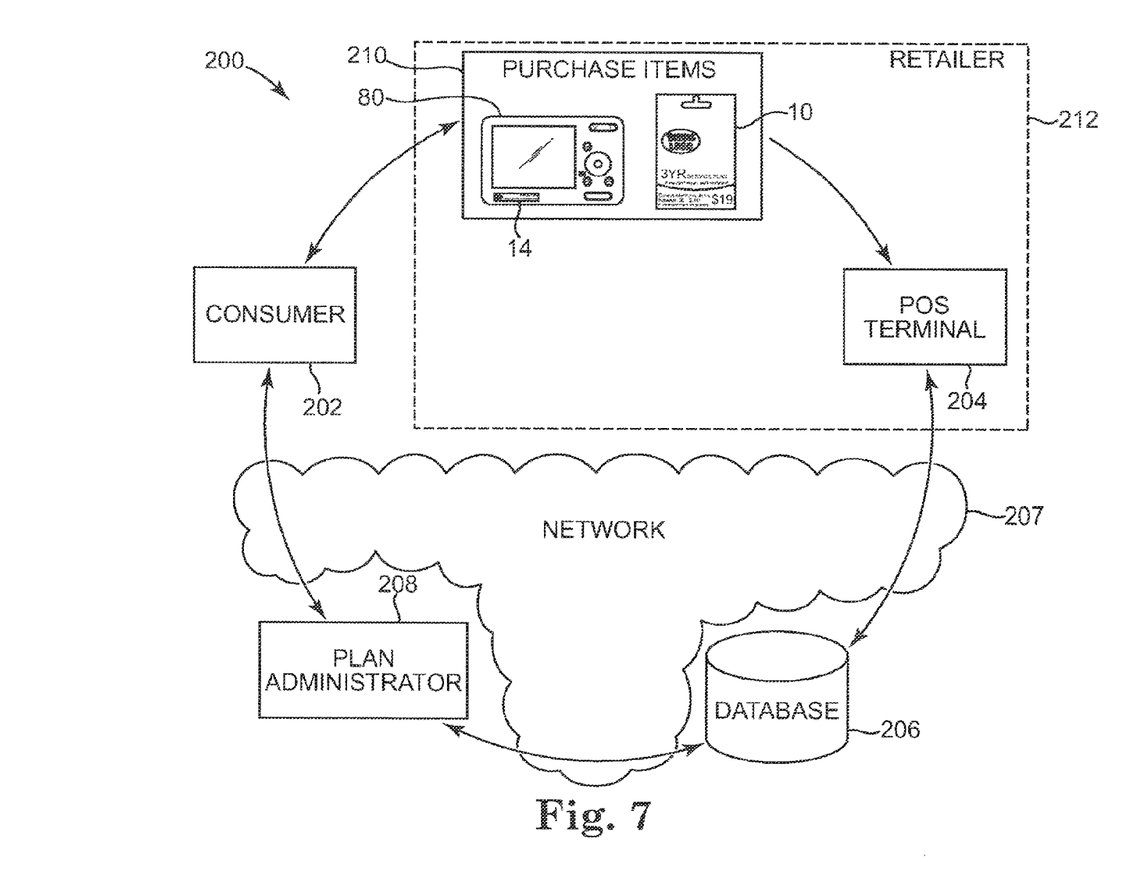
FIG. 7 is a schematic illustration of a service plan system including the service plan product of FIG. 1, according to one embodiment of the present invention.

In one embodiment, service plan product 10 is one of a plurality of service plan products 10, 100, 102, and 104 being offered for sale by the retailer as part of a service plan offering 106. For example, the plurality of service plan products 10, 100, 102, and 104 may each relate to a different purchase price tier for primary product 80 (FIG. 5). In general, the more expensive the primary product 80, the more expensive the associated service plan 10, 100, 102, or 104. As such, for example, a service plan product 10 offered with respect to a primary product 80 in a relatively low purchase price tier (for example, a primary product having a purchase price of $0 to $200) will be offered for a lower price (for example, $19) as compared to a service plan product 100 (for example, a service plan product offered for $29) offered with respect to a second primary product that is in a higher purchase price tier (for example, a primary product having a purchase price of $201 to $500), etc. In one embodiment, each price tier of service plan product 10, 100, 102, and 104 includes a different SKU 64 (FIG. 2) on backer 12 for ease of initialization and record keeping by retailer 212 and/or plan administrator 208 (FIG. 7). In one embodiment, each price tier of service plan is based only on the purchase price of an electronic primary product 80 without any regard for the various types of electronic primary products 80 eligible for protection with a service plan. In this manner, the number of SKUs 64 required for service plan offering 106 can be reduced as compared to service plan offering in which each type of electronic primary product 80 (such as camcorders versus DVD players, for example) has a different SKU 64 and corresponding service plan and price arrangement. Other tiers or types of service plan products or plans are also contemplated.

Although described for illustrative purposes as including four price tiers, any number of price tiers may be provided as desired and practical under the terms of the service plan. In one embodiment, other service plan tiers are provided such as, for example, service tiers where varying tiers represent varying levels of service or assistance in obtaining service.

In order to provide the plurality of service plan products 10, 100, 102, and 104 such that the products 10, 100, 102, and 104 are clearly and readily differentiated from one another, service plan products 10, 100, 102, and 104 respectively include tier indicia 82*a*, 82*b*, 82*c*, and 82*d*. In one embodiment, not only does tier indicia 82*a*, 82*b*, 82*c*, and 82*d* each indicate the primary product purchase price tier and the purchase price of the associated service plan, but, in one example, tier indicia 82*a*, 82*b*, 82*c*, and 82*d* also are each a different color such that serviced plan products 10, 100, 102, and 104 are color coded, further facilitating visual differentiation. For example, service plan product 10 relates to primary products 80 having a purchase price of between $0 and $200 and is or includes a portion that is a first color, service plan product 100 relates to primary products 80 having a purchase price of between $201 and $500 and is or includes a portion that is a second color, service plan product 102 relates to primary products 80 having a purchase price of between $501 and $1000 and is or includes a portion that is a third color, and service plan product 104 relates to primary products 80 having a purchase price equal to or greater than $1001 and is or includes a portion that is a fourth color.

Figure 6:
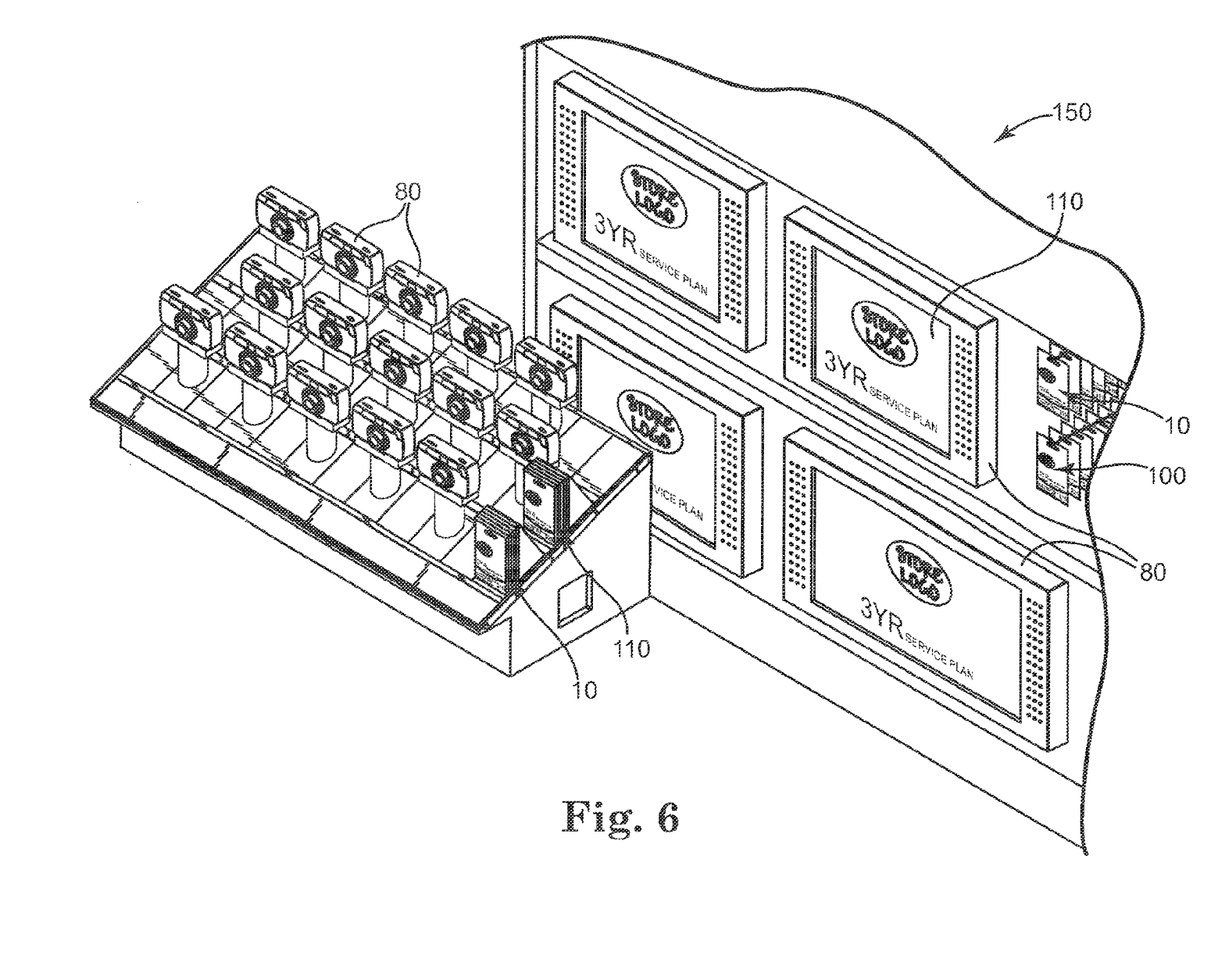
FIG. 6 is a schematic illustration of a retail display including service plan products and primary products, according to one embodiment of the present invention.

In addition or as an alternative to the color coding of service plan products 10, 100, 102, and 104, in one embodiment, service plan products 10, 100, 102, and 104 are placed in a retail display 150 to correspond with available primary products 80 to which each service plan product 10, 100, 102, and 104 corresponds as generally illustrated in FIG. 6. As used herein, "primary products" refers to the product purchased to be the subject of the associated service plan. In one embodiment, in order to be a primary product, a product generally is classified as an eligible product (i.e. a product for which a service plan can be purchased). In one embodiment, primary products 80 include electronic products. However, in other embodiments, other types of products may also be primary products. Where primary products 80 include electronic products, primary products 80 include one or more of a television, DVD (Digital Video Disc) player, digital camera, camcorder, MP3 player, cordless and corded telephones, prepaid cellular telephones, answering machines, caller ID machines, video game consoles, home theater systems, printers, audio accessories, radios, electronic toys and games, computer peripherals (e.g., scanner, monitor, CD/DVD burner, keyboard, mouse, speaker, memory, sound card, video card, webcam, etc.), etc.

Other advertisements and displays may be incorporated into the retail display 150. For example, in one embodiment where one primary product 80 being offered is a television, the television is configured to display information 110 about the service plan being offered, etc. Other methods of promoting the service plan products 10, 100, 102, and 104 that may or may not be part of the retail display 150 itself are also contemplated. In one embodiment, where primary products 80 and service plan products 10, 100, 102, 104 are offered for sale via a retailer website, products 80 and 10 may not physically be displayed in an associated manner, however, the retailer website may be configured such that viewing details about one of products 80 or 10 triggers visual and/or audio presentation to the consumer including details regarding the other of products 80 or 10.

FIG. 7 is a schematic illustration depicting a service plan system 200 for providing, servicing, and purchasing service plan products 10, 100, 102, and 104 according to one embodiment of the invention. It should be noted that in general, when service plan product 10 is mentioned herein, any other service plan product 100, 102, and 104 can be substituted therefore unless otherwise indicated or impractical. In one embodiment, service plan system 200 includes at least one consumer 202, a point-of-sale (POS) terminal or register 204, a database 206, and a plan administrator 208. POS terminal 204 is any terminal where a purchase can be made. In one embodiment, POS terminal 204 is one of a cash register, sales kiosk, self check-out kiosk, personal computer or other suitable personal device in the case of internet-based purchases, etc. In one embodiment, POS terminal 204 is included within or is in communication with a website provided by a retailer 212. Although primarily described below with respect to a POS terminal 204 in a brick-and-mortar store associated with retailer 212, upon reading of this description one of skill in the art will recognize how the described configuration can be modified to apply to an internet-base POS terminal 204.

POS terminal 204 is in communication with database 206, which stores information related to the service plans offered to consumer 202. In particular, database 206 includes account information, consumer information, logs of service plan claims, or any other information configured to facilitate service plan administration and record keeping. Plan administrator 208 is in communication with database 206 and may be local or remote relative to database 206. Plan administrator 208 is configured to communicate with consumer 202 to answer questions, service claims, process detailed registrations, if any, and to perform any other services or functions relating to the provision of a service plan.

In one embodiment, plan administrator 208 is a third party associated with retailer 212. For example, plan administrator 208 may be contractually connected with retailer 212 to provide support for service plans bought (as service plan products 10) from retailer 212. In one embodiment, plan administrator 208 may be part of retailer 212. In one embodiment, plan administrator 208 is bonded or insured through an insurance agency (not shown) in order to provide consumers 202 with the assurance that the service plan will be available and well funded throughout its term.

In one embodiment, one or both of POS terminal 204 and plan administrator 208 communicate with database 206 via a network 207 such as internal retailer or plan administrator network, external network (i.e., the Internet), or a combination network including internal and external networks in communication with one another. POS terminal 204 is configured to communicate with database 206 during registration of a service plan product 10 during a consumer purchase. For example, consumer 202 presents for purchase items 210 including a primary product 80 and a corresponding service plan product 10 (i.e., a service plan product 10 designating a price range including the price of primary product 80) at POS terminal 204. POS terminal 204 is configured to process each item (as will be described in further detail below) and to update database 206 accordingly. More specifically, POS terminal 204 updates database 206 to indicate that the service plan account, (which may be identified to database 206 by account identifier 72 on tag 14), associated with service plan product 10 corresponds with a particular primary product 80 purchased with service plan product 10. In this manner, database 206 stores information in a linked manner such that provision of account identification 72 along with reference to database 206 allows a user such as plan administrator 208 to determine the particular primary product 80 associated with a particular service plan based solely or primarily on account identification 72.

Accordingly, plan administrator 208 provides for administration of the service plan subsequent to the initialization of the corresponding service plan account at POS terminal 204 (e.g., during the active term of the service plan account). In particular, in one embodiment, plan administrator 208 may offer a call center and/or a website (not shown; e.g., via network 207) configured to facilitate communication with consumer 202 regarding a service plan. Plan administrator 208 collects additional information from consumer 202, fields claims for repair, service, and/or replacement, schedules repair, facilitates any communication with the original manufacturer of primary product 80, or performs any other services useful in fulfilling the terms of the service plan. Methods of administering the service plan will be further described below.

Figure 8:
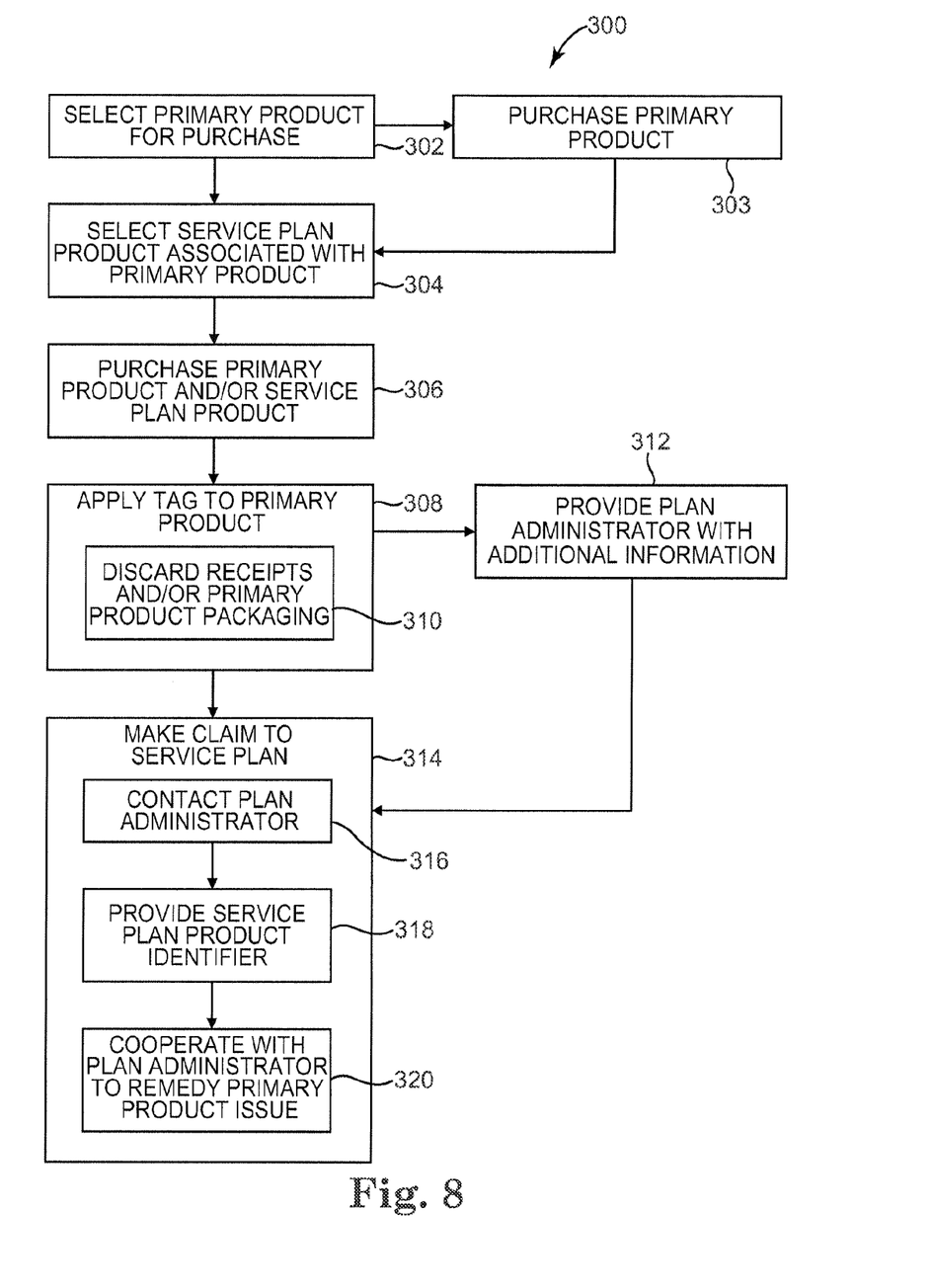
FIG. 8 is a flow chart illustrating a method of purchasing and utilizing a service plan, according to one embodiment of the present invention.

FIG. 8 illustrates one embodiment of a method of purchasing and redeeming a service plan as generally indicated at 300 and as described with additional reference to FIG. 7. At 302, consumer 202 selects a primary product 80 offered for sale by retailer 212 for purchase. When selecting primary product 80, consumer 202 will likely notice service plan products 10 displayed in proximity to primary product 80 as illustrated in FIG. 6 (or display upon prompt in retailer website) and/or may be directed to service plan products 10 in-store (on site) or other advertising or by a retailer worker or team member.

In one example, at 304, consumer 202 who desires to purchase a service plan for the selected primary product 80 may select an appropriate service plan product 10 corresponding with the purchase price of primary product 80 during the same shopping experience where primary product 80 is selected at 302. It should be noted that since service plan product 10 is available as a supplement to the purchase of primary product 80, in one embodiment, service plan product 10 is referred to as a secondary product 10. In one embodiment, at 306, consumer 202 purchases both primary product 80 selected at 302 and service plan product 10 selected at 304. During purchase, both products 80 and 10 are processed and automatically linked to one another in database 206 as will be further described below to initialize an associated service plan account defined in database 206 (i.e., to enroll primary product 80 in the service plan and to begin the active term of the service plan account). In one embodiment, the automatic linking and initialization or activation of the associated service plan account to primary product 80 is completed during processing products 10 and 80 for purchase and consumer 202 is not asked for any identifying, demographic, or personal information during that purchase. Accordingly, such automatic association decreases or eliminates consumer frustration and increases consumer satisfaction with the purchase.

In one embodiment, operation 304 does not occur during the same shopping experience as operation 302. Rather, following selection of primary product 80 at 302, primary product 80 is purchased at 303. Subsequently, but generally within a predetermined time period from operation 303, a service plan product 10 is selected at 304. For example, in one embodiment, operation 304 can be performed at any time within ninety days of operation 303. In such an embodiment, at 306, the service plan product 10 is presented for purchase with a purchase receipt (not shown) generated during operation 303. As such, at 306, the service plan account associated with service plan product 10 is initialized with respect to the previously purchased primary product 80 listed on the purchase receipt. By providing consumers 202 with an option to purchase service plan product 10 subsequent to the initial primary product purchase, pressure on consumer 202 to purchase such a plan is mitigated, thereby providing the consumer with additional peace of mind regarding such purchase.

More specifically, in one embodiment, when, at 306, the service plan account associated with service plan product 10 is initialized with respect to primary product 80 previously purchased at 303, retailer 202 uses the information on the original purchase receipt to return primary product 80 and subsequently uses the same information to repurchase primary product 80 with service plan product 10 (e.g., as described above when primary product 80 and service plan product 10 are initially purchased simultaneously). Notably, when this process is used, all necessary information for returning and repurchasing primary product 80 is included on the original purchase receipt such that the actual primary product 80 does not need to be brought back to retailer 212. Further, the original purchase price of primary product 80 is applied to the repurchase of primary product 80 such that, at 306, consumer 202 is only charged for service plan product 10 during its purchase and initialization. This processing is completed such that service plan system 200 associates service plan product 10 with primary product 80, and, in one embodiment, consumer 202 is not made aware that primary product 80 was technically returned and repurchased. Other methods of linking a subsequently purchased service plan product 10 with primary product 80 that do not generally utilize return and repurchasing of primary product 80 are also contemplated.

Following the purchase of primary product 80 and service plan product 10, consumer 202 takes both items to their car, home, and/or other location. At 308, consumer unpackages and/or unwraps primary product 10 from any packaging and removes tag 14 (FIG. 3) from portion 16 of backer 12 (FIG. 3) and firmly places and affixes tag 14 to primary product 10 for future reference (see for example the schematic illustration of FIG. 4). In one embodiment, following initialization of a service plan account and affixing tag 14 at 308, then at 310, all other receipts, primary product packaging, etc. is discarded or is not maintained for any subsequent service plan claim.

In one embodiment, no additional registration is completed by consumer 202 with respect to the service plan. Accordingly, in one example, service plan initialization or enrollment of primary product 80 in service plan is substantially paperless (in other words, no paper forms need be completed by consumer 202). In one example, consumer 202 may optionally provide additional information to plan administrator 208 for storage in database 206 such as personal contact identification and/or contact information in a formal register process at 312. More specifically, at 312, consumer 202 contacts plan administrator 208 and provides the additional information at some time subsequent to initialization of the associated service plan account.

If sometime during the term of the service plan, for example, within a three-year term of service, primary product 80 has an issue covered by the service plan (for example, the primary product fails to perform its intended functions due to dust, heat, humidity, normal wear and tear, has any defect in either materials or workmanship, or exhibits any other reason specified in the details of the service plan contract), consumer 202 makes a claim under the corresponding service plan. In particular, when consumer 202 detects a primary product issue, consumer 202 refers to tag 14 regarding how to make a claim to the corresponding service plan. At 314, consumer 202 uses contact information 70 and account identifier 72 from tag 14 to submit a service plan claim to plan administrator 208.

More specifically, using contact information 70, at 316, consumer 202 contacts plan administrator 208 to report the primary product issue and to request service to remedy or otherwise address the issue. In one embodiment, at 316, consumer 202 contacts plan administrator 208 via a telephone call or via a website associated with plan administrator 208. At 318, consumer 202 provides plan administrator 208 with service plan account identification 72 (FIGS. 3 and 4) when prompted to do so or at another appropriate time. For consumer ease, the service plan account identification 72 is provided on tag 14, which is affixed to primary product 80. In this manner, a claim can be made to the service plan at 314 without requiring consumer 202 to search through their records to find a purchase receipt, other warranty or service plan papers, primary product packaging, etc. As such, a claim can be made as described with respect to the embodiments herein with a considerably decreased burden as compared to typical service plans or warranty systems.

Upon receiving service plan product identification 72 at 318, plan administrator 208 accesses/communicates with database 206 to learn additional information about primary product 80 and requests any additional information regarding the primary product issue to access the best mode of servicing the product. Using the information provided by consumer 202 and found in database 206, plan administrator 208 provides a method of service (i.e., suggests a mode of repair, replacement, etc.) to remedy the primary product aliment, and consumer 202 cooperates with plan administrator 208 to remedy the primary product issue at 320.

In view of the above-described method 300, tag 14 decreases consumer paperwork as compared to typical service plans and contributes to a process of frustration-free claims since no paperwork or packaging need be located by consumer 202. Furthermore, it should be noted that the service plan is fully transferable. In one embodiment, the original or purchasing consumer places tag 14 on primary device 80 at 308. Subsequently, the purchasing consumer 202 is free to gift, sell, or otherwise transfer ownership of primary product 80 to other, secondary consumers. If primary product 80 suffers an covered issue while owned by either the purchasing consumer 202 or the secondary consumer, the current owner of primary product 80 can make a claim to the service plan at 314 using the information 70 and 72 on tag 14 provided that the service plan term has not yet expired.

In one example, upon transferring ownership of primary product 80 to another owner, neither owner is required to provide any such notice or other information to plan administrator 208 or retailer 212 to maintain the full term of the service plan. As such, ease of maintenance with regard to the service plan decreases consumer burden, which, in turn, generally increases consumer satisfaction with purchase of products 10 and 80. In one embodiment, where subsequent registration information was provided at 312, secondary consumer may, but is not generally required to, contact plan administrator 208 to update such information.

Figure 9:
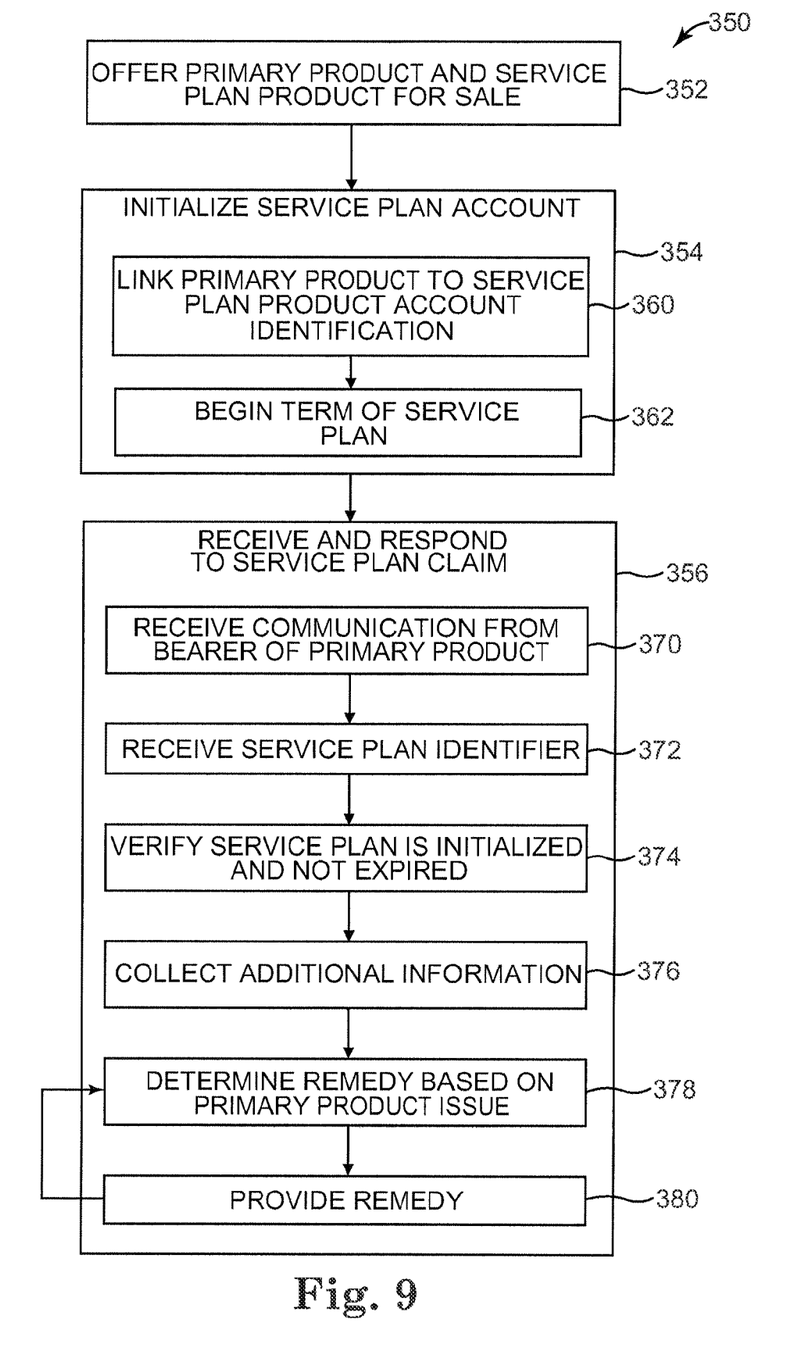
FIG. 9 is a flow chart illustrating a method of providing a service plan, according to one embodiment of the present invention.

FIG. 9 is a flow chart illustrating a method of providing/servicing a service plan generally indicated as 350, in accordance with one embodiment of the present invention, and described with respect to FIG. 7. Method 350 includes offering primary products 80 and service plan products 10 for sale at 352, initializing a service plan account at 354, and receiving and responding to claims made to the service plan account at 356. More specifically, at 352, retailer 212 offers primary products 80 and service plan products 10 for sale, for example, as illustrated in FIG. 6, displaying primary products 80 for sale in a brick-and-mortar establishment. In other embodiments, depictions of primary products 80 and service plan product 10 are placed on a retailer website (not shown) and linked to one another to appropriately inform consumers 20 of the opportunity to purchase service plan product 10.

At 354, the service plan is initialized. In one embodiment, the service plan is initialized during the purchase of a primary product 80. More specifically, during purchase of primary product 80, service plan product 10 is also presented for purchase by consumer 202 at POS terminal 204. In one embodiment, service plan product 10 is processed for purchase by simply scanning account identifier 58 (FIG. 2), which alerts system 200 to initialize the associated service plan account or record stored in database 206. In one embodiment, service plan product 10 is processed for purchase by first scanning or other entering secondary identifier or SKU 64 (FIG. 2) into POS terminal 204, which notifies system 200 that a service plan in a particular purchase price tier is being processed. Subsequently, account identifier 58 is scanned or otherwise entered into POS terminal 204 to identify the particular service plan account being initialized.

At 360, POS terminal 204 communicates with database 206 to record the particulars of primary product 80 in or in association with the service plan account or record linked to service plan product 10 by account identifier 58 and/or account identification 72. As such, the primary product 80 is linked to the corresponding service plan identification 72. In one embodiment, products in addition to primary product 80 and service plan product 10 are purchased during a single sales transaction. In one embodiment, POS terminal 204 is configured to automatically appoint the most expensive product being purchased in the transaction as primary product 80.

In one example, this method of designating the primary product may be complicated where two or more items with the same or similar purchase prices are eligible as primary products and are purchased in a single transaction together with one service plan product 10. In such an example, all of the two or more items eligible as primary products may be provisionally designated as corresponding to corresponding service plan account. However, when a claim is made to the service plan account for one of the provisionally designated products, the other provisionally designated products are dropped from the service plan account. As such, in one embodiment, the service plan account is only configured to provide service with respect to one primary product 80. In one embodiment, the retail worker (not shown) or consumer 202 otherwise designates what product in the transaction is primary product 80 that should be linked to each service plan product 10 being purchased/initialized.

As briefly described above, in one embodiment, service plan product 10 can be selected and purchased for application to a previously purchased primary product 80, for example for a primary product 80 purchased within the last ninety days. In such an embodiment, consumer 202 presents service plan product 10 and a receipt from the purchase transaction for primary product 80 at POS terminal 204 where the service plan product 10 is processed as described above. However, instead of scanning or otherwise entering primary product 80 for purchase, a receipt identifier (not shown) is entered into POS terminal 204 allowing primary product 80 to be selected from the list of products purchased and listed on the receipt. As described above, in one embodiment, the receipt identifier is used to return primary product 80 and to repurchase primary product 80 with service plan product 10 to automatically associate service plan product 10 and primary product 80 with one another. Since service plan product 10 may be purchased after the initial purchase of primary product 80, the pressure and anxiety of consumer 204 to decide whether to purchase service plan product 10 during the initial transaction, in which primary product 80 is purchased, is decreased.

At 362, once the service plan account is associated with service plan product 10 and tag 14 included therewith, the active term of the service plan account begins immediately. In this manner, service plan coverage of primary product 80 begins on the date service plan product 10 is purchased and continues for a predefined term such as for three years, etc. Even though a service plan account is initialized upon purchase of service plan product 10, in one embodiment, service plan product 10 is returnable for a full refund of the purchased price. In one embodiment, such return is limited to a predefined time period, for example, to a period within ninety days of purchase.

Following initialization at 354, the service plan account is active such that claims may be made to the service plan account for the given term. Accordingly, plan administrator 208 is configured to receive claims at 356 associated with the now-activate service plan account and corresponding primary product 80 at any time during the predefined term of the service plan as measured from the date of initialization. More specifically, at 370, plan administrator 208 receives communication from consumer 202 (whether the purchasing consumer or a secondary consumer) regarding a condition or issue of primary product 80 for which the consumer requests assistance in addressing. In particular, at 372, consumer 202 provides plan administrator 208 with account identification 72 as obtained from tag 14, which has since been adhered or otherwise coupled with primary product 80. Using account identification 72, plan administrator 208 accesses database 206, more particularly, the service plan account linked to account identification 72. In one embodiment, plan administrator 208 and consumer 202 remotely communicate with one another in any suitable manner, such as via telephone or via a website, for example, using network 207. In one embodiment, plan administrator 208 and consumer 202 communicate in a face-to-face manner at retailer 212 or a location associated therewith.

At 374, plan administrator 208 reviews the corresponding service plan account to verify that the service plan has previously been initialized, that the service plan account corresponds with a primary product 80 matching any description provided by consumer 202, and/or that the service plan account has not expired (i.e., the term for service plan protection has not passed).

Once plan administrator 208 verifies that service plan account is the proper account, has been initialized, and has not expired, then, at 376, plan administrator 208 collects any additional information useful in determining a course of action for repairing, replacing, or otherwise servicing primary product 80 to rectify the issue or condition of primary product 80 that prompted consumer 202 to make a claim for assistance. For example, plan administrator 208 may inquire regarding the nature of the condition or issue of primary product 80, time lines, primary product 80 responses to proposed condition remedies, etc.

Using information from database 206, more particularly, data from the corresponding service plan account stored therein, and the information collected at 376, then at 378, plan administrator 208 determines a remedy and method of providing that remedy to consumer 202. In some instances, the remedy may simply be to send a replacement part, such as a new battery or light bulb to consumer 202 with instructions for replacing the old part with the replacement part. In other instances, the remedy may include deploying a service technician to a home or business of consumer 202 to repair primary product 80 (i.e. on-site servicing). If certain repairs cannot be completed where primary product 80 is located and primary product must be repaired at another location, the service plan may cover all shipping and handling costs.

In one example, the proposed remedy is for consumer 202 to send primary product 80 to a service center for inspection and/or repair (i.e., depot servicing). In such instances, in one implementation, plan administrator 208 provides consumer 202 with postage paid supplies for mailing primary product 80 or is otherwise configured to reimburse consumer 202 for all or part if incurred shipping and handling expenses.

In one embodiment, determining the remedy includes reviewing a record of prior claims stored as part of service plan account in database 206 to ascertain whether a similar issue has previously been reported with regard to the same primary product 80. In some instances where a condition or issue of primary product 80 is recurring, plan administrator 208 may deem primary product 80 to be a "lemon" and may determine the appropriate remedy to be replacement of primary product 80. Where the proper remedy is determined to be replacement due to recurring issues and/or for any other reasons, in one embodiment, a stored-value card (not shown) is issued to consumer 202 for the full purchase price of primary product 80. In one example, the stored-value card is available for use only at retailer 212 (i.e., including the actual store or website and other similarly branded or otherwise associated stores or websites). In one embodiment, the stored-value card is issued with no substantive restrictions other than value. Accordingly, the stored-value card may be applied toward the purchase of a replacement primary product and/or toward the purchase of any other related or non-related items offered for sale by retailer 212 at the discretion of consumer 202. By offering such a stored-value card, consumer 202 is encouraged to return to retailer 212, which provides retailer 212 with additional and beneficial marketing opportunities with respect to consumer 202.

In one embodiment, determining a remedy at 378 includes accessing information regarding any manufacturer's warranty provided for primary product 80. If the manufacturer's warranty for primary product 80 covers the condition reported by consumer at 376, then the remedy provided by plan administrator is to facilitate making a claim to the original product manufacturer including paying all or part of shipping or other costs incurred by consumer 202 in submitting the claim to the manufacture that would not otherwise be paid by the manufacturer. In this manner, in one example, the service plan is provided to supplement the manufacturer's warranty rather than to supplant or otherwise extend the manufacturer's warranty. After the manufacturer's warranty expires, the service plan continues to provide its own benefits, some of which may match certain benefits originally provided by the manufacturer.

At 380, the remedy determined to be appropriate at 378 is provided to consumer 202. If any provided remedy is unsuccessful in addressing the condition of primary product 80 that lead to the claim, operations 378 and 380 are repeated as necessary until the condition is properly addressed to the satisfaction of consumer 202. In one embodiment, the service plan is provided such that all costs or fees associated with the provided remedy are paid by plan administrator 208 rather than by consumer 202. In this manner, the service plan benefits consumer 202 as it has no out-of-pocket expenses, deductibles, or other fees in addition to the original purchase price of the service plan/service plan product.

In one embodiment, the operations of method 350 are performed by one or collectively performed by both of retailer 212 and plan administrator 208. In one example, operations 352 and 354 are performed by retailer 212 and claim operations 356 is performed by plan administrator 208. However, many varieties of task distribution between retailer 212 and plan administrator 208 are also contemplated and will be recognized upon reading of this disclosure. Further, in one embodiment where retailer 212 includes plan administrator 208, retailer 212 performs all operations of method 350.

With the above-described embodiments in mind, a service plan as described herein is configured to provide consumers with an easy to select, manage, and redeem plan as compared to prior art service plans. In addition, in embodiments described herein, the service plan is configured to be provided to consumers in a low-pressure sales environment, which further contributes to the consumer's peace of mind and satisfaction with retailer 212.

Although the invention has been described to particular embodiments, such embodiments are for illustrative purposes only and should not be considered to limit the invention. Various alternatives and changes will be apparent to those with ordinary skill in the art. Other modifications within the scope of the invention and its various embodiments will be apparent to one of ordinary skill upon reading this disclosure.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A warranty plan system comprising:
a physical display within a retail store;
a tangible warranty plan product positioned on the physical display, the tangible warranty plan product including:
a preprinted label including information identifying an individual warranty plan account, the individual warranty plan account providing for or facilitating repair, replacement and other servicing of a primary product as needed during a predefined term of the individual warranty plan account, wherein the primary product is initially separate from the tangible warranty plan product,
a first bar code identifying one of a plurality of available tiers of warranty plan accounts,
a second bar code for the warranty plan product, the second bar code indicating the individual warranty plan account and the tier indicated by the first bar code, and
a backer selectively coupled to and supporting the preprinted label such that the preprinted label is readily removable from the backer for placement on the primary product, wherein the first bar code and the second bar code are supported by the backer and exist prior to positioning the tangible warranty plan product on the physical display, and wherein the information identifying the individual warranty plan account is separate from the first bar code and the second bar code; and a point-of-sale register within the retail store, the point-of-sale register being configured to receive the tangible warranty plan product once the tangible warranty plan product is transferred to the point-of-sale register from the physical display, the point-of-sale register being configured to optically read the first bar code and the second bar code of the tangible warranty plan product and a primary product bar code of the primary product during a mercantile transaction in which the tangible warranty plan product and the primary product are processed as separate items for retail sale, the point-of-sale register including a computer that is programmed to process the first bar code as an indication of the identified one of the plurality of available tiers of warranty plan accounts and that is programmed to process the second bar code as an indication of the link between the tangible warranty plan product and the individual warranty plan account within the one of the plurality of available tiers of warranty plan accounts, wherein the primary product bar code differs from the first bar code and the second bar code, and the point-of-sale register associates the primary product with the individual warranty plan account based on the second bar code, which is optically read from the tangible warranty plan product, and the primary product bar code, which is optically read from the primary product, and initializes the tangible warranty plan account for a predetermined term, wherein the backer includes a pocket, and the tangible warranty plan product comprises a tangible contract sheet providing details regarding terms of the individual warranty plan account, including the second bar code, and being maintained in the pocket of the backer.

2. The warranty plan system of claim 1, wherein the backer defines a card.

3. The warranty plan system of claim 2, wherein the card includes an aperture, and the aperture is received by a peg hook in the physical retail store such that the card hangs from the peg hook in the physical retail store.

4. The warranty plan system of claim 2, wherein the card is colored to visually indicate the tier of the warranty plan account indicated by the first bar code, wherein different warranty plan products include cards with different colors, and wherein the different warranty plan products are associated with different tiers of warranty.

5. The warranty plan system of claim 1, wherein the physical retail display is spaced from the point-of-sale terminal and separately supporting both the primary product and the warranty plan product.

6. The warranty plan system of claim 1, wherein the backer includes a foldable flap configured to selectively cover the label.

* * * * *